Oct. 31, 1950 H. H. CLAYTON 2,528,035

SWITCH

Filed March 7, 1946 4 Sheets-Sheet 1

Inventor:
Harold H. Clayton.
By Brown, Jackson, Boettcher & Dienner
Attys.

Oct. 31, 1950 H. H. CLAYTON 2,528,035

SWITCH

Filed March 7, 1946 4 Sheets-Sheet 2

Inventor:
Harold H. Clayton
By Brown, Jackson, Boettcher & Dienner
Att'ys.

Inventor.
Harold H. Clayton.
By Brown, Jackson, Boettcher & Dienner
Attys.

Oct. 31, 1950 H. H. CLAYTON 2,528,035

SWITCH

Filed March 7, 1946 4 Sheets-Sheet 4

Inventor:
Harold H. Clayton
By Brown, Jackson, Boettcher & Dienner
Attys.

Patented Oct. 31, 1950

2,528,035

UNITED STATES PATENT OFFICE 2,528,035

SWITCH

Harold H. Clayton, Logansport, Ind., assignor, by mesne assignments, to Essex Wire Corporation, Logansport, Ind., a corporation of Michigan Application March 7, 1946, Serial No. 652,674

15 Claims. (Cl. 200—16)

My present invention relates to improvements in switches, and more particularly to switches having use in directional signalling systems for automotive vehicles.

It has now become widespread practice to equip automotive vehicles with a pair of lamps at each side of the vehicle at either or both of the forward and rearward ends thereof which lamps according to one signalling system now in use are caused to be energized intermittently to give a visual signal of a turn to be made. My invention has to do primarily with switches for use in such or other signalling systems although it will be understood that the switches have other uses in which it is desired to control the selective energization of a plurality of circuits. Also, while I have shown my switches embodied in a flashing type of directional signalling circuit it will be understood that the switch has use in other signalling systems wherein for example signal lamps are caused to be energized continuously, and some means other than flashing is used to indicate that a turn is to be made or is being made.

It is an object of my invention to provide a switch of the above character having a normal or neutral position and which is adapted to be actuated to complete selectively one of a plurality of circuits.

A further object of my invention is to provide a switch in which a pair of contact carrying block members are normally biased in one predetermined position, and having means for selectively effecting movement of either of the block members independently of the other to effect the selective completion of either one of a pair of circuits in which the switch is adapted to be incorporated.

A further object is to provide a switch in which a pair of contact members are carried by a pair of block members normally biased to effect positioning of the contact members in a predetermined normal position, and a common operating means or block carrier member for effecting the selective movement of either of the block members independently of each other against the biasing means to effect the completion of either of a pair of circuits in which the switch is adapted to be incorporated.

A further object of my invention is to provide a switch comprising the elements last aforesaid in which the operating or block carrier member, the block members, and the contact members carried by the latter are arranged with respect to the biasing means so that upon release of the common operating means in effecting a selective energization of either of the pair of circuits cause the several elements to return to their normal positions.

The above and other objects, advantages and features of my invention will appear from the detail description.

Now in order to acquaint those skilled in the art with the manner of construction and utilizing switches in accordance with my invention, I shall describe in connection with the accomp^nying drawings certain preferred embodiments of my invention.

Figure 1:
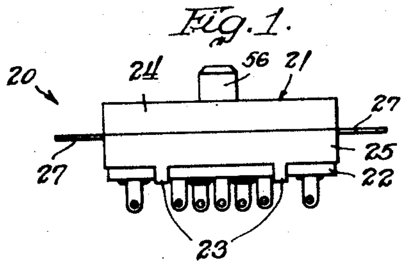
Figure 1 is a side elevational view of one form of switch constructed in accordance with my invention.
Figure 2:
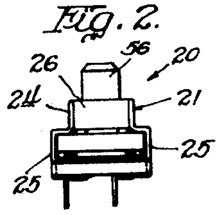
Figure 2 is an end elevational view of the switch of Figure 1.

Referring now to the drawings, and more particularly to Figures 1 through 9, it will be seen that I have provided a switch 20 comprising a switch casing formed by a metal housing member 21 in the bottom open end of which a plate member 22 of insulating material is adapted to be secured by a plurality of bent over ears on lug elements 23 formed integrally with the housing member 21 and extending from the open end thereof. The housing 21 is preferably made of sheet metal which through a suitable forming or stamping operation is formed with a substantially channel shaped section 24 from the side edges of which lengthwise extending side wall members 25—25 depend. The opposite ends of the channel shaped section 24 are closed by end walls 26—26 from which suitable integral outturned flanges or lugs 27—27 extend to provide for mounting of the switch.

Figures 3, 4:
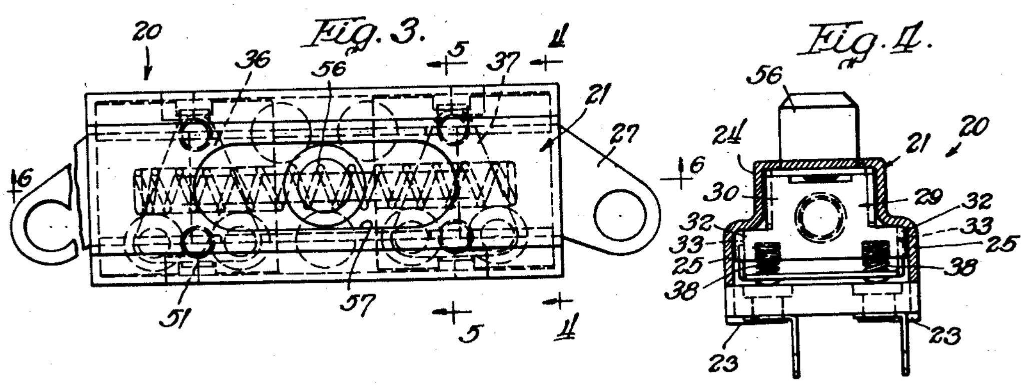
Figure 3 is an enlarged plan view of the switch of Figure 1.
Figure 4 is a view taken substantially on the line 4—4 of Figure 3 looking in the direction indicated by the arrows showing the casing in section and in end elevation certain of the parts of the switch.
Figures 5, 6:
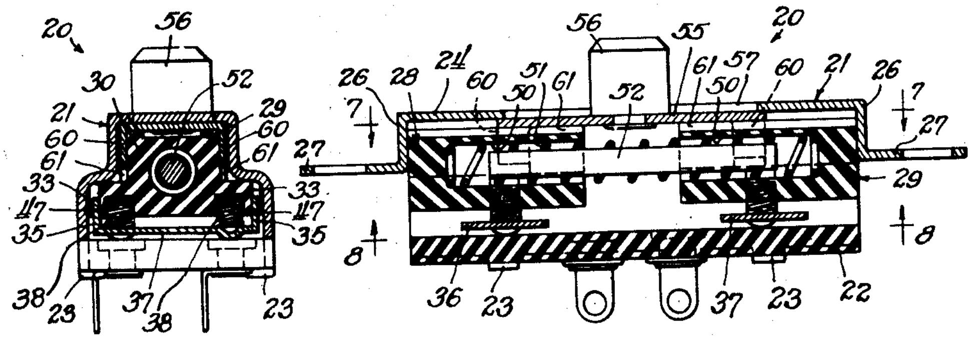
Figure 5 is a detail vertical sectional view taken substantially on the line 5—5 of Figure 4 looking in the direction indicated by the arrows.
Figure 6 is a longitudinal vertical sectional view taken substantially on the line 6—6 of Figure 3 looking in the direction indicated by the arrows.
Figure 7:
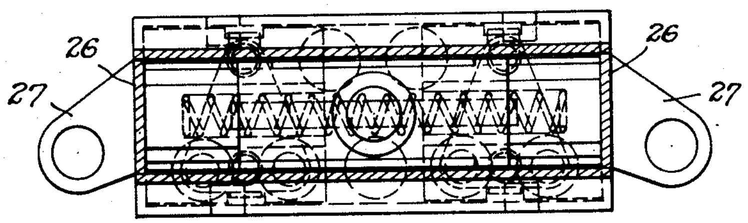
Figure 7 is a detail horizontal sectional view taken substantially on the line 7—7 of Figure 6 looking in the direction indicated by the arrows.
Figure 8:
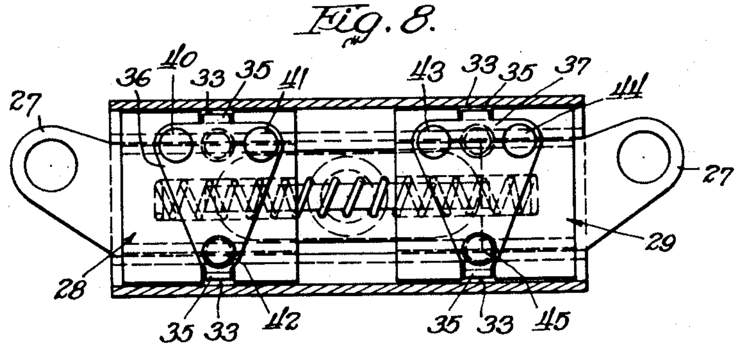
Figure 8 is a detail horizontal sectional view taken substantially on line 8—8 of Figure 6 looking in the direction indicated by the arrows.

A pair of contact carrying blocks 28 and 29 made of insulating material are mounted for rectilinear sliding movement lengthwise within the switch casing 20 and as will be more clearly seen in Figures 4 and 5 are each provided with a reduced upper end portion 30 fitting in the section 24 of the switch housing 21 together with integral laterally extending flange portions 32—32 the upper surfaces of which are adapted to have guiding engagement with the lengthwise extending shoulders at the intersections of the side walls 25—25 with the channel shaped section 24. The opposite side edges of the contact carrying block members 28 and 29 are provided with opposed grooves 33—33 into which grooves ears or lugs 35—35 of a pair of metal contact plate members 36 and 37 associated respectively with the block members 28 and 29 are adapted to extend. As shown more clearly in Figures 4 and 5, a pair of small coil springs 38—38 are arranged between each of the contact carrying blocks 28 and 29 and contact plates 36 and 37, respectively, for yieldingly urging the contact plate members 36 and 37 into engagement with the upper surface of the insulated plate member 22. It will be observed that the contact plate members 36 and 37 are substantially triangular in plan and that plate member 36 is provided with three contacts 40, 41 and 42 formed by depressing of the metal adjacent the corners thereof with the contact plate 37 in like manner also being provided with three contacts 43, 44 and 45. These several contacts are adapted to have engagement with certain of the contacts in the insulating plate member 22 as will be described in greater detail hereinafter. The depressions forming contacts 42 and 45 of the plate members 36 and 37, respectively, each provide for the reception of one of the ends of one of the pair of coil springs 38—38 and with the other ends of the several coil springs being received in cylindrical inwardly extending recesses 47 formed in the block members 28 and 29. As will be been more clearly in Figure 6, the contact carrying block members 28 and 29 are each provided with a cylindrical recess 50 extending inwardly of the opposed inner ends thereof, and which recesses provide for the reception of the opposite ends of a coil spring 51. A guide pin 52 is disposed internally of the coil spring 51 for preventing buckling thereof. It will be observed that the coil spring 51 normally tends to maintain the contact carrying block members 28 and 29 in the position shown in Figure 6 with the outer ends of the block members in abutting engagement with the closed end portions 26—26 of the channel shaped section 24 of the switch housing member 21. An operating member or block carrier means 55 is mounted for rectilinear movement with the channel shaped section 24 of the switch casing, and has a knob member 56 secured intermediate its ends as by riveting. The knob member 56 extends through a lengthwise extending slot 57 formed in the upper end wall of the housing 21. The side edges of the member 55 at the opposite ends thereof are each provided with a pair of depending ears or lugs 60—60 which are adapted to engage shoulders 61—61 formed integrally of block members 28 and 29 adjacent the opposed inner ends thereof. The depending ears or lugs 60—60 at each end of the carrier member 55 together with the integral shoulders or lugs 61—61 of each of the contact carrying block members 28 and 29 provide one way motion transmitting connecting means by reason of which either of the contact carrier block members 28 and 29 may be moved rectilinearly longitudinally within the switch casing by sliding movement of the carrier member in the switch casing.

By virtue of this arrangement of the block carrier or operating means 55 and the block members 28 and 29 it will be observed from Figure 6 that if the carrier member 55 is moved to the right as by grasping of the knob 56 and moving it lengthwise in the slot to the right, that the block member 28 by virtue of the engagement of the lugs 60—60 formed integrally of the member 55 with the shoulders 61—61 of the block member 28 that it will be shifted to the right against the force of spring 51. Upon the movement of the carrier member to the right it will be observed that the ears 60—60 at the right hand end of the carrier member 55 simply slide along the side edges of the block carrier member 29 so that it and the contact plate 37 remain in the position shown in the drawings with the spring 51 being effective to maintain it in abutting engagement with the adjacent end wall 26 of the channel shaped section 24. Upon movement of the carrier member to the left the reverse action takes place namely, the block member 29 and its associated contact plate 37 are shifted to the left against the force of spring 51 while the block member 28 and its associated contact plate 36 remain in the position shown in the drawing.

Figure 9:
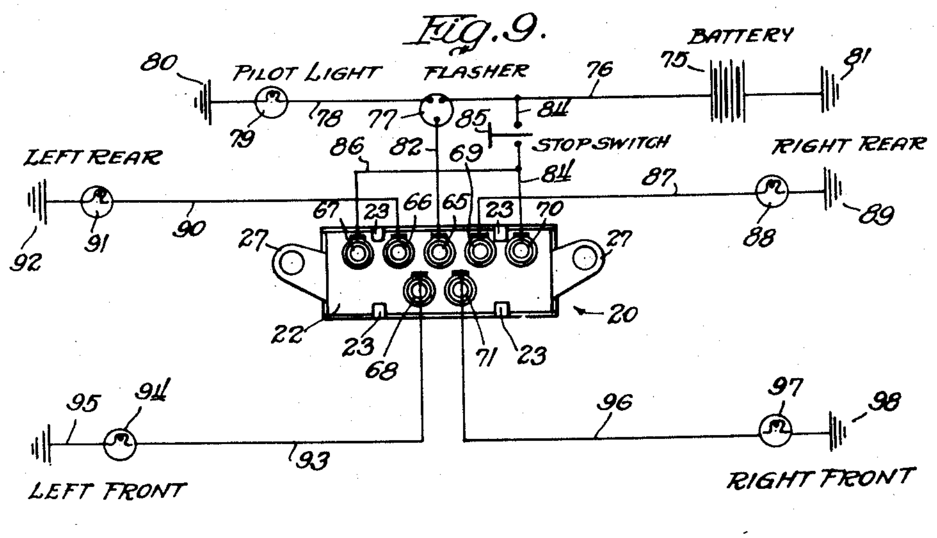
Figure 9 is a bottom view of the switch of Figures 1 through 8 and illustrating the connection thereof in a directional signal circuit.
Figure 10:
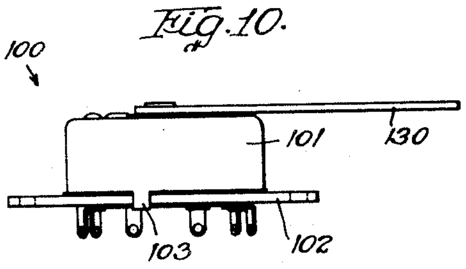
Figure 10 is a side elevational view of another form of switch constructed in accordance with my invention.
Figure 11:
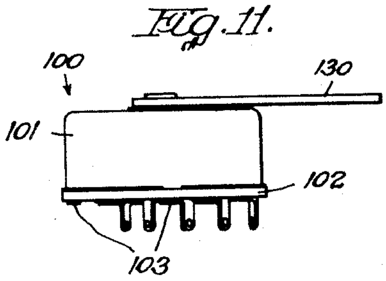
Figure 11 is an end view of the switch of Figure 10.
Figure 12:
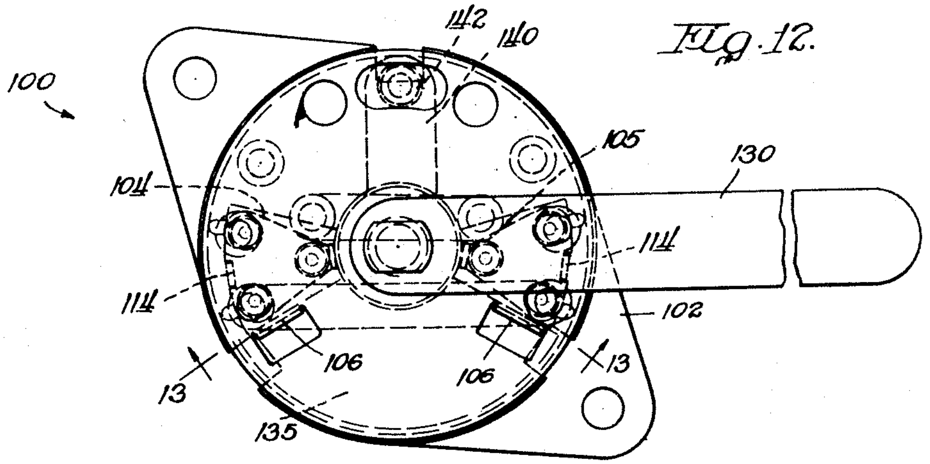
Figure 12 is an enlarged plan view of the switch shown in Figures 10 and 11.
Figure 13:
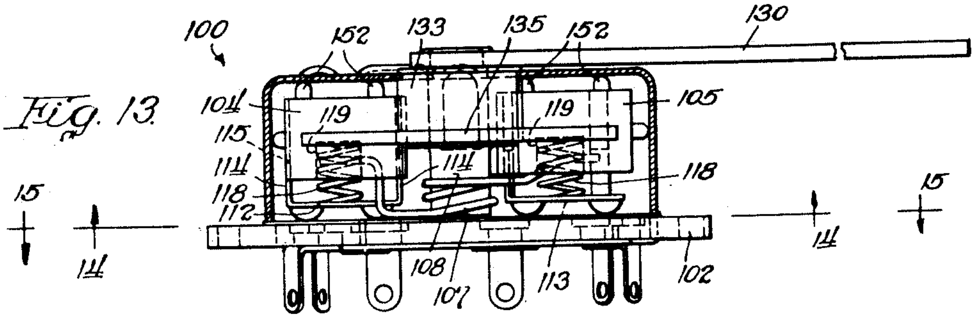
Figure 13 is an enlarged view of the switch of Figures 10 through 12 showing certain of the parts or elements of the switch in elevation and with the enclosing housing in section taken substantially on line 13—13 of Figure 12 and looking in the direction indicated by the arrows.

The plate member 22 of switch 20 as shown in Figure 9 is provided with a plurality of contacts 65, 66, 67, 68, 69, 70 and 71 suitably secured therein. The several contacts 65 through 71 are of the rivet form having the inner ends thereof lying substantially flush with the inner surface of the insulating plate member 22, and are riveted over at their outer ends to secure them in plate 22. Riveting of the outer ends of these contacts also serves to secure a lead connecting lug for each of the contacts externally of plate 22.

The directional signal circuit of Figure 9 comprises a battery 75 from which a lead 76 extends to a flasher mechanism 77 of known construction. A second terminal of the flasher 77 has connection by means of lead 78 with one terminal of a pilot light 79 with the other terminal of the pilot light having connection to the ground as at 80. It will be understood also that the battery has its other terminal connected to ground as at 81 which is a conventional circuit expediency used in automotive vehicles. A lead 82 extends from a third terminal of the flasher to the contact 65. In the normal position of the switch as shown, for example, in Figure 6, the contact plate 36 by engagement of its contacts 40 and 41 bridges the contacts 66 and 67 in the insulated plate member 22 with the contacts 43 and 44 of contact 37 bridging contacts 69 and 70 of the insulated plate 22. A lead 84 has connection with the lead 76 anterior of the flasher 77 and a known conventional form of stop switch 85 is interposed in the lead 84 with this lead having connection at its other end with the contact 70 of the plate member 22. A lead 85 is connected to lead 84 posterior of the switch 85 and extends to the contact 67. Now with the switch in its normal position, as shown in Figure 6, and upon closing of the stop switch 85 it will be observed that a circuit may be traced from the battery 75, lead 76, lead 84, contact 70, contact 44 of the contact plate member 37, plate 37, contact 43 of the latter, contact 69 and from the contact 69 through a lead 87 extending to the filament 88 of a right rear lamp for a vehicle and ground connection 89. Also when the stop switch 85 is in closed position a circuit can be traced from the lead 76 to the lead 84, lead 86, contact 67, the contact 40 of the contact plate member 36, the plate 36, contact 41 of the latter, the contact 66 of the plate member 22 and then by lead 90 to the filament 91 of a left rear lamp, ground 92, and to the ground connection 81 of the battery to effect a stop indication in the left rear lamp of the vehicle. Thus in the normal positions of the pair of contact carrying contact block members 28 and 29, and the contact plate members 36 and 37 carried thereby, respectively, it will be observed that upon closing of the stop switch 85 both left and right rear filaments may be caused to be continuously energized so long as stop switch 85 is closed to give a stop signal.

Assume now that the knob 56 is shifted to the right as viewed in Figure 6 to move the contact plate member 36 to its right hand position in the switch casing. In this position the contacts 40 and 41 of the contact plate 36 engage and bridge the contacts 66 and 65, respectively, and the contact 42 is in engagement with the contact 68 of the insulated plate member 22. It will be observed in this position of block 28 and contact plate 36 that a circuit may be traced from the battery 75 to the flasher 77, the lead 82 to the contact 65, and through the contact plate member 36 to the contact 66, and then by a lead 90 to the filament 91 and ground 92. The positioning of the contact plate member 36 in the position last noted is also effected to establish a circuit from the battery 75, the lead 76, flasher 77, contact 65, contact member 36, through the contact 42 thereof which in this position has engagement with the contact 68, and from which a lead 93 extends to the filament 94 of a left front lamp with the lead 95 extending from the left front lamp to ground to complete the circuit. Thus in the positioning of the contact carrier member 28 to the right as viewed in Figure 6 it will be observed that the left rear and left front filaments 91 and 94, respectively, of left rear and left front lamps of a vehicle may be caused to be intermittently energized to give a flashing signal and in this manner give a visual indication of a left hand turn. The flasher as previously noted is of known construction and provides for the intermittent flow of current through the circuits to the filaments 91 and 94 last described to effect the intermittent energization thereof. Under these conditions it will be observed that the contact block member 29 remains in its normal position shown in Figure 29 in which the contacts 43 and 44 of the contact plate member 37 engage and bridge the contacts 69 and 70, respectively of the plate member 22 so that in the event the stop switch 85 is closed, the filament 88 of the right rear lamp will be energized to give a visual stop indication while the left rear and left front filaments 91 and 94, respectively, are given a flashing signal indicating a left hand turn.

When the knob 56 of the carrier means or operating member 55 is shifted to the left, as viewed in Figure 6, it will observed that the contact carrying block member 29 is shifted to its left hand position to effect engagement of the contacts 43 and 44 of the contact plate member 37 with the contacts 65 and 69, respectively, of the plate member 22 and with the contact 45 of the plate member 37 in engagement with the contact 71. Under these conditions the contact carrier block member 28 remains in its normal position due to the one way motion transmitting connection of the carrier member 55 with the block member 28. Under these conditions a circuit may be traced from the battery 75, the lead 76, the flasher 77, the lead 82, the contact 65, the contact 43 of the plate member 37, the contact plate 37, and the contact 44 of the latter, the contact 69, to the lead 87 which effects the intermittent energization of the filament 88 of the right rear lamp with the circuit being completed through the ground connection 89. Also in this position of the block carrier member 29 a circuit may be traced from the battery 75, the lead 76, the flasher 77, the lead 82, the contact 65, contact 43 of plate member 37, the plate member 37, contact 45 of the latter, which is in engagement with the contact 71 of the insulated plate member 22, and by a lead 96 having connection with the contact 71 to the filament 97 of a right front lamp which has connection to ground as at 98 to complete the circuit through the ground 81 of battery 75. It will be observed also that the current flowing through the filament 97 first passes through the flasher and will effect the intermittent energization of the filament 97 to give a flashing indication of a right hand turn. Under these conditions, it will be further observed that upon closing of the stop switch 85 a circuit may be traced from the battery 75, the lead 84, the stop switch 85, the lead 86, the contact 67, the contact 40 of the contact plate 36, plate 36, contact 41 of the latter, the contact 66, and lead 90 to left rear filament 91 and ground 92 to effect the continuous energization of the filament 91 for a visual stop signal at the left rear end when the switch is actuated to indicate right hand turn of the vehicle.

It will be observed that since the block carrier member or means 55 is normally caused to assume the position shown in Figure 6 that a directional signalling energization of the front and rear lamps of the vehicle is effected only so long as the carrier member is shifted to the right or the left, and held in a shifted position against the force of the spring 51 normally tending to maintain the carrier means or operating member 55 in its normal position. It will be understood that timing mechanisms or other suitable means associated with the steering wheel of the vehicle may be so arranged with respect to the knob 56 to maintain it in either of its shifted positions, either for a predetermined position length of time, or until the vehicle has been straightened out after completion of a left hand or right hand turn. The provision of such means for controlling a directional signal switch are well known in the art and is thought need not be herein described in detail for an understanding of my present invention.

Referring now to Figures 10 through 16, I have disclosed another preferred embodiment of my invention in which actuation of the switch means is effected by rotary movement of a suitable operating member in lieu of the rectilinear or straight line movement of the embodiment of the invention disclosed in Figures 1 through 9. In Figures 10 through 15 it will be observed that the rotary form of directional signal switch 100 comprises a metal cylindrical cup-shaped housing 101 closed at its upper end and having a plate member 102 of insulating material suitably secured in the bottom open end thereof by a plurality of lugs 103 integral with the metal housing 101 which are bent over to secure the plate member in position. In this form of the invention a pair of contact carrying block members 104 and 105 made of insulating material are mounted for rotary movement within the switch housing, and are normally urged by means of a spring member 107 disposed about a pin 108 extending axially of cylindrical housing 101 into engagement with abutment lugs 106—106 extending inwardly of the closed end of housing 101 and integral therewith. As shown the spring 107 has its opposite free ends 109 and 110, respectively, engaging the opposed side faces of the contact carrying block members 104 and 105 opposite the faces thereof adapted to engage the inwardly extending integral abutments 106—106 of the switch housing section 101.

A pair of contact plate members 112 and 113 are associated, respectively, with the contact block members 104 and 105 and are provided each with a pair of lugs or ears 114—114 fitting in suitably formed vertically extending slots 115—115 formed in each of the contact carrying blocks 104 and 105. The block members 104 and 105 each have a spring 118 having one end disposed in vertically extending recesses 119 formed in the block members with the opposite ends of the springs 118 bearing against the inner surface of the contact plate members 112 and 113 for biasing the latter into engagement with the inner surface of the insulating plate member 102. As shown more clearly in Figure 14 the contact plate member 112 is provided with three depressions forming contacts 120, 121 and 122 with the contact plate member 113 being similarly formed with a plurality of depressions forming contacts 123, 124 and 125. The pin 108 extends coaxially of the axis of the housing section 101 and at its upper end has fixed connection with the inner end a handle member 130 as by peening over of the outer end of the pin. A bearing sleeve 131 is suitably secured as by riveting of the upper end thereof over the upper surface of the housing section 101 and through which the pin 108 extends. The handle 130 forms one element of a block carrier means or operating member, and which as shown more clearly in Figure 14 comprises a plate member 135 secured to the pin 108 below the sleeve 133 and substantially centrally of the closed upper end of housing 101 and the insulated plate 102. The arrangement is such that upon grasping of the handle 130 the plate member 135 is caused to be rotated with the edges 136 and 137 thereof adapted to engage the adjacent side edges of the contact carrying block members 104 and 105 respectively, to effect rotary movement of the latter and of the contact plate members carried thereby. A spring member 140 also has connection with the pin 108 for rotation therewith with the free end of the spring member having a pin 142 extending upwardly thereof and which through the spring member 140 is adapted to have yielding biasing engagement in a slotted depression 143 formed in the upper closed end of the casing 102 or selectively, in either of the depressions 144 or 145 depending upon the position of the handle member 130. The contact carrying block members 104 and 105 along the outer cylindrical surfaces are each provided with a pair of rounded head members 150 to reduce the frictional drag of the contact block carrying members 104 and 105 to a minimum. Also the upper surfaces of each of the contact carrier block members 104 and 105 are provided with a plurality of rounded head members 152 to further minimize frictional drag and rotary movement of the block members 104 and 105 within the casing.

The plate member 102 is provided with a plurality of contacts 153 through 160 with the contacts 156 and 157 being connected by a flat metal strap member 161 and with the contacts 155 and 158 being connected by a flat metal strap member 162. The several contacts 153 through 160 are of the rivet type and at their outer ends are arranged to secure suitable connecting lugs at the outer surface of the insulating plate member 102 for the connection of suitable leads thereto.

Figure 14:
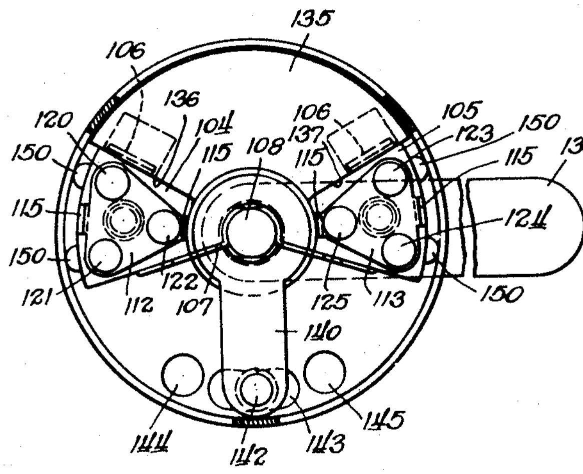
Figure 14 is a detailed horizontal sectional view taken substantially on line 14—14 of Figure 13 looking in the direction indicated by the arrows.
Figure 15:
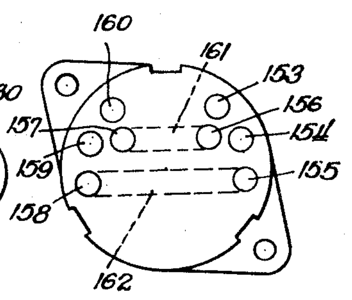
Figure 15 is a plan view of the insulating plate member enclosing the open end of the metal switch casing illustrating an arrangement of contacts therein when the switch is embodied in a typical directional signal circuit.

In the normal position of the carrier means for the pair of contact blocks 104 and 105 with the handle lever in the position shown in Figure 14 and with the pin 142 carried at the free end of the spring member 140 in the elongated groove 142, the spring 107 is effective for maintaining the contact blocks in the position shown with the contacts 123 and 124 of contact plate 113 in engagement respectively with the contacts 155 and 154 of the plate member 102 respectively. Also in this position the contacts 120 and 121 of contact plate member 112 have contacting engagement with the contacts 158 and 159 of the plate member 102, respectively.

Figure 16:
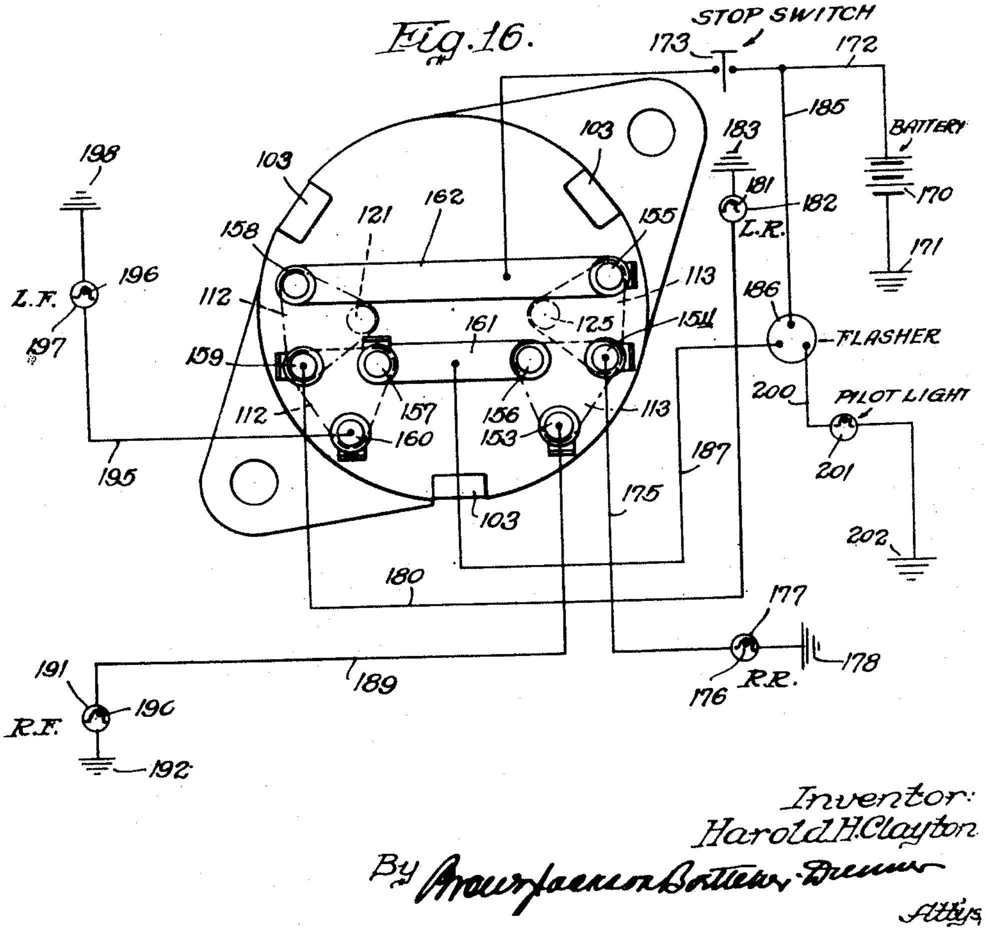
Figure 16 is a bottom view of the switch of Figures 10 through 15 and showing a typical directional signal circuit with which the switch has been incorporated.

Referring now to Figure 16 it will be observed that a battery 170 has one terminal connected to ground as at 171 and from the other terminal of which a lead 172 having a stop switch 173 of conventional construction interposed therein extends to the connector 162 connecting terminals 155 and 158. When the stop switch 173 is closed with the contact plates 112 and 113 in normal position, it will be observed that a circuit is completed through contact plate 113 bridging contacts 154 and 155 and from the latter of which a lead 175 extends to the filament 176 of a right rear lamp 177 which is grounded as at 178 to complete the circuit back to ground 171 of the battery. Also the contact plate 112 bridges the contacts 158 and 159. A lead 180 extends from contact 159 to the filament 181 of a left rear lamp 182 with the other terminal thereof being connected to ground as at 183 to complete a circuit to ground 171 of the battery 170. Thus in the normal position of the switch 100 and upon actuation of the stop switch 173 the filaments 176 and 181 of the right and left rear lamps respectively will be continuously energized to give a stop signal. Now upon movement of the handle 130 in a clockwise direction as viewed in Figure 14 the contact block member 105 is caused to be rotated in a clockwise direction to engage the contact 123 of contact plate member 113 with contact 154, contact 124 of contact plate member 113 with the contact 153, and the contact 125 of contact plate member 113 with contact 156 of the plate member 102, respectively. With the contact plate member 113 in this position it will be observed that a circuit may be traced from the battery 170, lead 172, a lead 185 which has connection with the lead 172 anterior of the stop switch 173 having connection with one terminal of a known flasher mechanism 186. A lead 187 extends from another terminal of the flasher device 186 to the connecting member 161. The plate member 113 in the position last described bridges the several contacts 153, 154 and 156 whereby the filament 176 of the right rear lamp is caused to be energized intermittently, and by reason of a lead 189 extending from the contact 153 to a right front filament 190 of a right front lamp 191 and ground connection 192 effects the intermittent energization of the right front filament 190. Thus in this position of the block carrier member 105 and contact plate member 113, a flashing directional signal is given by the intermittent energization of the filaments 176 and 190 of the right rear and right front lamps 177 and 191, respectively. As before, since the contact block 104 remains in its normal position closing of the stop switch 173 will cause continuous energization of the left rear lamp filament 182 to give a visual stop indication upon closing of the stop switch and with the handle 181 of the block actuating means in the position last described.

Upon movement of the handle 130 in a counter-clockwise direction as viewed in Figure 14 it will be observed that the contact carrying block member 104 is caused to be rotated in a counter-clockwise direction in the switch housing so that the contact 121 of contact plate member 112 is adapted to engage the contact 160 of the plate member 120, the contact 120 is adapted to have contacting engagement with the contact 159, and the contact 122 is adapted to have contacting engagement with the contact 157 of the plate member 102. In this position of the contact carrier member 104 and the contact plate 112, it will be observed that the latter effects bridging of the several contacts 157, 159 and 160 so that a circuit may be traced from the battery 170, lead 172, lead 185, the flasher 186, the lead 187, the connector 161, contact plate 112, contact 121 of contact plate 112 in engagement with the contact 160 of plate member 102 from which a lead 195 extends to a filament 196 to a left front lamp 197 and ground 198 to complete the circuit with the battery. Also a circuit may also be traced from the contact plate member 112, contact 120, the contact 159 of the insulated plate member 102, lead 180, and the filament 182 of the left rear lamp 182 to ground 183 so that in the position of the contact carrier block member 104 and the contact plate 112 last assumed intermittent energization of the filaments 196 and 181 of the left front and left rear lamp, respectively is effected. Also in this position and with the contact plate 113 in its normal position, closure, of the stop switch 173 will effect the continuous energization of the right rear filament 176 of the right rear lamp 177. As shown in this figure the flasher comprises a third terminal from which a lead 200 extends to the filament of a pilot light 201 which has a ground connection 202 for completing a circuit with the battery 170. The arrangement of the flasher is such that the pilot light is energized to give visual indication to the driver when the handle member 130 is moved from its normal position to effect indication of a right or left hand turn.

In the rotary movement of the handle lever 130 it will be observed that the pin 142 carried at the end of spring member 140 engaging in the slot 143 or depressions 144 or 145 provides a sensible indication of the position of the switch to the operator.

While I have shown the switches of my invention embodied in a directional signalling system for an automotive vehicle it will be understood that the switches may have other uses and that various other contact arrangements may be provided between the contact plate members carried by the block members and the contacts of the insulating plate members for such other uses and purposes. Also while I have shown what I consider to be the preferred embodiments of my invention it will be understood that various rearrangements and modifications may be made therein without departing from my invention.

I claim:

1. In a switch of the character described, a switch casing, a pair of contact carrying block members mounted for reciprocal sliding movement longitudinally of said casing, spring means between said block members for normally maintaining them in abutting engagement with the opposite ends of said casing, and a block carrier member bridging said block members and mounted for movement longitudinally of said casing, said block carrier member having one way motion transmitting connection with each of said block members so that when said block carrier member is moved toward either one of said block members the block member toward which it moves remains in its normal position, and the block member away from which said carrier member moves is caused to be moved longitudinally inwardly of said casing against the force of said spring means.

2. In a switch of the character described, a switch casing, a pair of contact carrying block members mounted for reciprocal sliding movement longitudinally of said casing, spring means between said block members for normally maintaining them in abutting engagement with the opposite ends of said casing, block carrier means bridging said block members and mounted for reciprocal movement longitudinally of said casing, and one way motion transmitting means between said block carrier means and each of said block members adapted when said block carrier means is moved toward either of said block members the block member toward which it is moved remains in its normal position, and the block member away from which said block carrier means is moved is caused to be moved longitudinally inwardly of said casing against the force of said spring means.

3. In a switch of the character described, a switch casing, a pair of contact carrying block

[redacted]

10. In a switch of the character described, a switch casing comprising a cylindrical housing closed at one end and open at the other end, and having a plate member of insulating material provided with a plurality of contacts mounted in the open end of said housing, a pair of spaced abutments extending inwardly of said casing, a pair of contact carrying block members of insulating material mounted for rotary sliding reciprocal movement in said casing about the axis of said housing, contact members carried by said block members for movement therewith and normally bridging certain of the contacts of said plate member, spring means between said block members and said contact members for yieldingly biasing the latter into engagement with said plate member, spring means between said block members normally maintaining the latter in abutting relation with said abutments, block carrier means mounted for rotation about the axis of said housing, and spring means between said block members for maintaining them in spaced relation and in engagement with said block carrier means, said block carrier means upon rotary movement thereof being adapted to rotate either one of said block members independently of and toward the other against the force of said spring means therebetween and thereby effect bridging engagement of other of the contacts of said plate member by said contact members.

11. In a switch of the character described, a switch casing comprising a cylindrical housing closed at one end and open at the other end, and having a plate member of insulating material provided with a plurality of contacts mounted in the open end of said housing, a pair of spaced abutments extending inwardly of said casing, a pair of contact carrying block members of insulating material mounted for rotary sliding reciprocal movement in said casing about the axis of said housing, contact members carried by said block members for movement therewith and normally bridging certain of the contacts of said plate member, spring means between said block members and said contact members for yieldingly biasing the latter into engagement with said plate member, spring means between said block members normally maintaining the latter in abutting relation with said abutments, block carrier means mounted for rotation about the axis of said housing, spring means between said block members for maintaining them in spaced relation and in engagement with said block carrier means, said block carrier means upon rotary movement thereof being adapted to rotate either one of said block members independently of and toward the other against the force of said spring means therebetween and thereby effect bridging engagement of other of the contacts of said plate member by said contact members, and spring means between said block carrier means and said housing providing a manually sensible indication of the position of said block carrier means in said casing.

12. In a switch of the character described, a switch casing comprising a housing and a plate member of insulating material mounted in said housing, a pair of contact carrying block members of insulating material mounted for reciprocal sliding movement in said casing and relative to said plate member, contact members carried by said block members for movement therewith, a plurality of stationary contacts carried by said plate member, spring means between said block members for normally maintaining each of them in one position relative to said plate member and with the contact members carried by said block members in engagement with certain of the plurality of contacts of said plate member, common block carrier means associated with said block members normally maintained by said spring means in a position with each of said block members and the contact members carried thereby in said one position, and said block carrier means including means for moving the same in opposite directions in said housing relative to said plate member to effect independent movement of either of said block members in opposite directions with respect to each other and the contact members carried thereby against the force of said spring means from said one position to a second position of contact of each of said contact members with the stationary contacts of said plate member.

13. In a switch of the character described, a switch casing comprising a metal housing and a plate member of insulating material forming a wall of said housing, a pair of contact carrying block members of insulating material mounted for reciprocal sliding movement in said casing and relative to said plate member, contact members carried by said block members for movement therewith, a plurality of stationary contacts carried by said plate member, spring means between said block members for normally maintaining each of them in one position relative to said plate member with the contact members carried by said block members in engagement with certain of the plurality of contacts of said plate member, spring means between said block members and said contact members carried thereby and acting substantially at right angles to said first spring means for urging said contact members toward said plate member, common block carrier means associated with said block members and normally maintained by said first named spring means in position with each of said block members and said contact members carried thereby in said one position, and said block carrier means having means for rendering it movable in opposite directions from its normal position in said housing and having one-way motion transmitting connection with each of said block members, whereby said block members and the contact members carried thereby are movable independently of and in opposite directions with respect to each other and against the force of said first named spring means from said one position to a second position wherein each of said contact members are adapted to have contact with other of the contacts of said plate member.

14. In a switch of the character described, a switch casing comprising a housing and a plate member of insulating material mounted in said housing, a pair of contact carrying block members of insulating material mounted for sliding movement toward and away from each other in said casing and relative to said plate member, contact members carried by said block members for movement therewith, a plurality of stationary contacts carried by said plate member, spring means between said block members for normally maintaining each of them in one position relative to said plate member and with the contact members carried by said block members in engagement with certain of the plurality of contacts of said plate member, a common block carrier means associated with said block member normally maintained by said spring means in a position with each of the said block members and the contact members carried thereby in said one position, and said block carrier means including means for moving the same in opposite directions in said housing relative to said plate member to effect independent movement of each of said block members in opposite directions with respect to each other and the contact members carried thereby against the force of said spring means from said one position to a second position of contact of each of said contact members with the stationary contacts of said plate member.

15. In a switch of the character described, a switch casing comprising a metal housing and a plate member of insulating material forming a wall of said housing, a pair of contact carrying block members of insulating material mounted for sliding movement toward and away from each other in said casing and relative to said plate member, contact members carried by said block members for movement therewith, a plurality of stationary contacts carried by said plate member, spring means between said block members for normally maintaining each of them in one position relative to said plate member with the contact members carried by said block members in engagement with certain of the plurality of contacts of said plate member, spring means between said block members and said contact members carried thereby and acting substantially at right angles to said first spring means for urging said contact members toward said plate member, common block carrier means associated with said block members and normally maintained by said first main spring means in position with each of said block members and said contact members carried thereby in said one position, and said block carrier means having means for rendering it movable in opposite directions from its normal position in said housing and having one-way motion transmitting connection with each of said block members, whereby said block members and the contact members carried thereby are movable independently of and in opposite directions with respect to each other and against the force of said first named spring means from said one position to a second position wherein each of said contact members are adapted to have contact with other of the contacts of said plate member.

HAROLD H. CLAYTON.

REFERENCES CITED

The following references are of record in the file of this patent:

UNITED STATES PATENTS

| Number | Name | Date |
|---|---|---|
| 1,241,510 | Hanff | Oct. 2, 1917 |
| 1,450,930 | Walter | Apr. 10, 1923 |
| 1,641,720 | Widmer | Sept. 6, 1927 |
| 1,709,619 | Johnson | Apr. 16, 1929 |
| 1,844,731 | Whittingham | Feb. 9, 1932 |
| 2,288,207 | Quillery | June 30, 1942 |